United States Patent
Bilger

[11] 3,797,579
[45] Mar. 19, 1974

[54] MOVING-IMPLEMENT CONTROL-GUARD SYSTEM

[76] Inventor: George H. Bilger, Monkton Rd., Monkton, Md. 21111

[22] Filed: Aug. 2, 1972

[21] Appl. No.: 277,063

[52] U.S. Cl................ 172/42, 172/364, 172/508, 56/17.4, 74/566
[51] Int. Cl.... A01b 33/00, A01d 35/12, G05g 1/00
[58] Field of Search............. 172/42, 43, 364–369, 172/508; 74/566, 608; 56/10.1, 16.9–17.6, DIG. 18, DIG. 24; 180/19; 200/157

[56] References Cited
UNITED STATES PATENTS

| 2,330,646 | 9/1943 | Voigt et al. ................ 200/157 X |
| 2,368,290 | 1/1945 | Donald ........................ 172/364 X |
| 3,035,386 | 5/1962 | Jepson et al. ............... 180/19 R X |
| 3,181,640 | 5/1965 | Goodacre et al. ........... 180/19 R |
| 3,198,922 | 8/1965 | Rohacs ....................... 200/157 |
| 3,642,333 | 2/1972 | Eisenhardt et al. .......... 172/763 X |
| 3,716,975 | 2/1973 | Smith .......................... 56/256 X |

FOREIGN PATENTS OR APPLICATIONS

| 832,553 | 2/1952 | Germany .................... 180/19 R |
| 747,752 | 4/1956 | Great Britain ............... 56/17.3 |
| 1,050,835 | 12/1966 | Great Britain ............... 180/19 H |
| 501,094 | 11/1954 | Italy ............................ 74/566 |

Primary Examiner—Robert E. Pulfrey
Assistant Examiner—Paul T. Sewell
Attorney, Agent, or Firm—John F. McClellan, Sr.

[57] ABSTRACT

A moving-shield system for implement controls including a pushrod-mounted inclined deflector fin having an angle causing it to overhang and follow the movements of a pushrod control lever.

5 Claims, 7 Drawing Figures

MOVING-IMPLEMENT CONTROL-GUARD SYSTEM

This invention relates generally to machinery guards and specifically to pushrod control lever shields for agricultural implements and the like.

In agricultural implements and similar devices, lever actuated pushrods are widely used for control of various functions of the machines, such as for clutch controls of the implements and accessories, throttle controls, height controls and braking.

Pushrods are stronger than flexible cables and consequently are built into quality equipment in which heavy leverage is required in control systems.

The strong levers supplied in implements such as garden plows provide for reliable operation of the devices, and seldom break when struck against tree limbs, fence rails and similar fixed objects during operation.

However, the very strength of the lever systems can more frequently than realized contribute to situations during operation in which property damage and serious or fatal personal injuries can result.

For example, in walking tractor equipment such as in the best quality lines of front-end accessory-attachment equipment, widely spaced handlebars equipped with levers-and-rods provide for operator control.

This inventor owns one of these implements, and in spite of the very powerful engine, finds it easy to control by means of levers conveniently mounted on the handle bars, which acutate pushrods running forward.

Each handlebar has a top-mounted lever which swings fore-and-aft in an upward arc just forward of the operator handgrip, and which points almost horizontally forward in the operating position.

The inventor was aware that branches could catch on the levers, and that his hands could be injured at such times when operating the levers, and that he could suffer other injuries from branches breaking loose.

However, an entirely unexpected and potentially even more serious incident of similar type occured while the inventor was cultivating past young trees in his nursery, at a fast walk. A stout limb from one of the young trees caught in the "V" formed at a forward pointing control lever mounted on one of the handlebars, and pivoted the tractor about, simultaneously tipping it over and exposing the rotating tines, which the inventor was barely able to avoid tumbling forward into.

On looking into the problem, it became apparent that some safety means other than the original-equipment small shield overlapping the "V" at the point of the lever was needed to prevent recurrence of the danger. Handlebar mounted shields over the levers would have been better than nothing, but had the drawback of being fixed in position, making hand pinching likely during control operations while either failing to give good protection or else making access awkward.

After some consideration, the present invention was made and has proved entirely satisfactory in operation, fulfilling the intended objects of the invention, including:

provision of a safety shield system which guards pushrod lever controls from objects passed, preventing jamming, snagging or damage, while at the same time preserving fast, safe manual access to the controls;

provision of a safety shield system for pushrod control levers which promotes more efficient use of implements at higher speeds, closer to obstacles, with less attention to maintaining clearance, than with existing guards; and provision of a safety shield system for push-rod control levers which is adapted to fit most installations, both as an added accessory and as original equipment, which is easy to install, economical to produce, attractive in appearance and which is durable and reliable in operation.

In a representative embodiment the invention includes a pushrod-mounted inclined deflector spaced from the pushrod lever in the plane of operation of the lever, in such relation that the deflector tends to follow the lever and overhang the lever at the most dangerous portion of the lever arc.

The above and other objects and advantages of the invention will become more readily understood on examination of the following description, including the drawings in which.

Figures 1A, 1B:
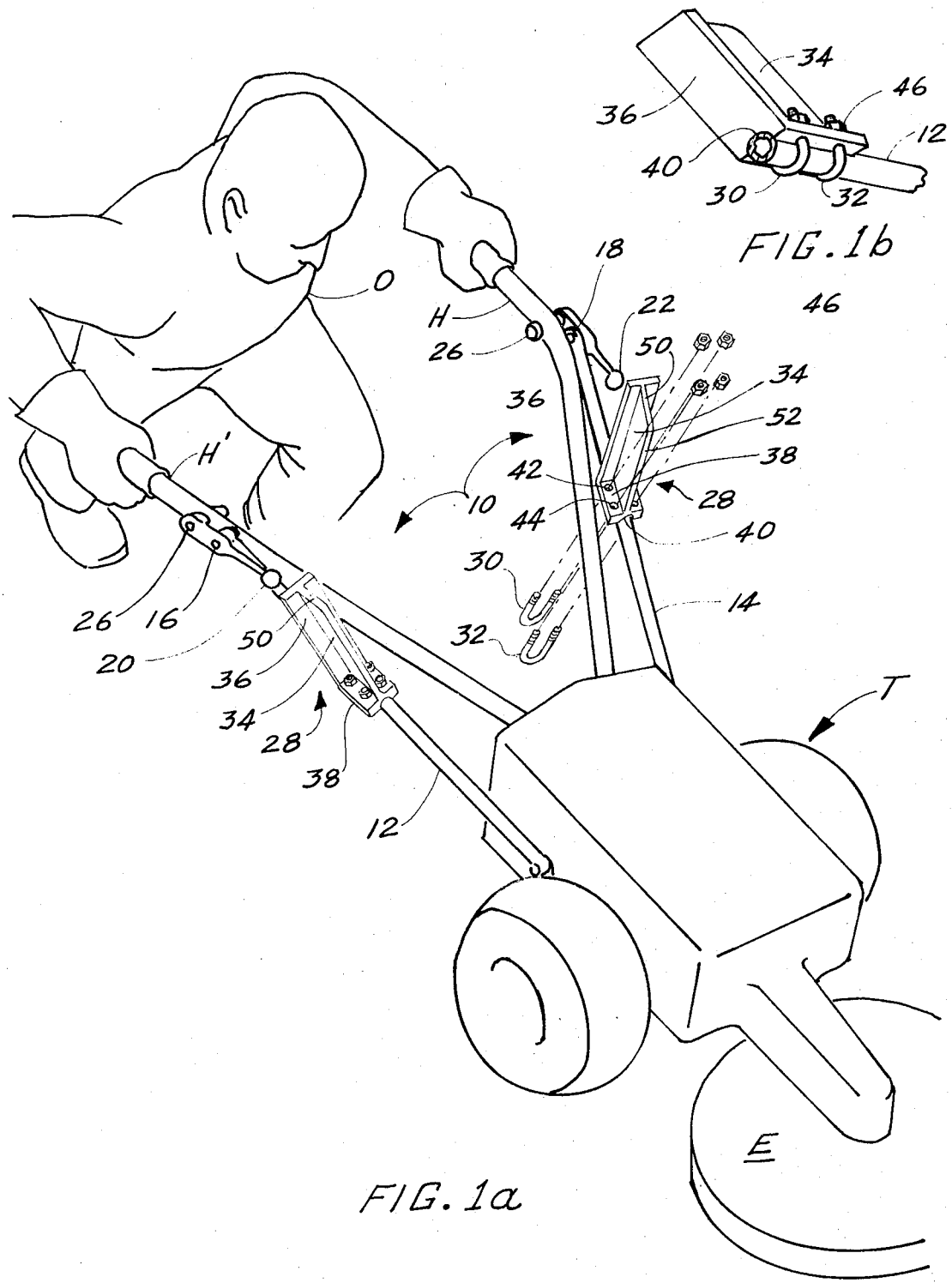
FIG. 1a is a perspective view in a downward direction of an implement having the safety system of this invention.
FIG. 1b is a detail.

Referring now to the FIGURES in detail, FIG. 1a illustrates a typical model of a high quality walking tractor T having front mounted accessory equipment E, and handlebars H, H' for guidance by an operator O.

Pushrods 12 and 14 which typically are provided to actuate vehicle motion and accessory operation in the forward parts of the implement, are at the ends pivoted at 16 and 18 intermediate the lengths of pushrod control levers 20 and 22 on the respective handlebars. The pushrod control levers are pivoted at the ends 24 and 26, respectively, to the handlebars.

In operation, the pushrod control levers swing up and over in the arcs indicated, forcing the pushrods to travel in a substantially axial direction. A forward pointing operational position of the pushrod control levers is typical of the arrangement engineered into such implements. For "human engineering" purposes, shoving a lever forward to go forward and pulling it back to stop tends to make operation simplest and safest, as a familiar general rule. However, the unguarded "V" shaped trap formed between the pushrod control lever and the handlebar by this feature of forward position equalling "go," is, as noted, a greater hazard than ordinarily recognized. Tree limbs L, branches, fence structure and other objects easily wedge in the "V", in extreme cases preventing operation of the pushrod control lever, deflecting and even overturning the implement, damaging property, and causing personal injury.

A variety of guards fixed to the handlebars can be conceived, but in order to provide close-in shielding for pushrod control levers in the forward positions, such must be cumbersome and restrictive of access.

FIG. 1a together with FIG. 1b, a detail, looking forward, shows the guard system 10 of this invention, which efficiently and reliably shields the dangerous "V" trap, while at the same time affording safe operating access at all times.

An angled deflector 28 is secured by "U" bolts or clamps 30, 32 to the pushrod ahead of the pushrod control lever. Spacing and deflector angle are such that with the lever in the forward position the deflector overhangs the lever beyond a plane tangent to the lever at a distance sufficient to avoid finger pinching. Breadth of the deflector 28 is preferably slightly greater than the width of the levers 20, 22 and length is preferably slightly greater than lengths of the levers.

In the preferred form the deflector comprises an open "L" shaped flange with a gusset 34 spanning the continuous upright flange portion 36 and the base flange portion 38. The base flange portion has a groove 40 in the bottom and two pairs of perforations 42, 44. The groove fits the pushrod to which the deflector is secured by the two "U" bolts, which pass upward through the perforations. Nuts 46 fasten the ends of the "U" bolts at upper face of the bottom flange portion. The rounded parts of the "U" bolts provide good clearance at the handlebars.

The gusset 34 or fin of the deflector is thin relative to the width of the flanged portions, so that objects tend to slip to the side instead of riding on a face.

Both the leading edge and the top are inclined to shunt objects upward over the pushrod control lever and the operator's hands. The incline 50 at the top is more nearly horizontal than the leading edge incline 52, and helps to release objects such as tree limbs more gently than if they were allowed to snap back directly from the more abrupt incline.

FIG. 2 illustrates a cardinal feature of the invention, namely the creating of a moving shield system instead of a fixed guard by mounting the deflectors 28 on the pushrods 12, 14 rather than on the handles of the implements.

This feature incorporates the pushrods as part of the shield system, so that the deflectors 28 rise and move to the rear following the pushrod control levers.

Figure 2A:
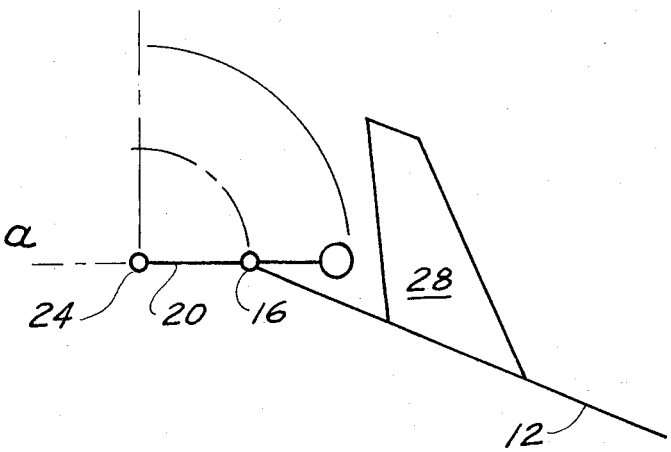
FIGS. 2a, 2b and 2c are diagrammatical elevations showing relations of parts according to the invention.
Figure 2B:
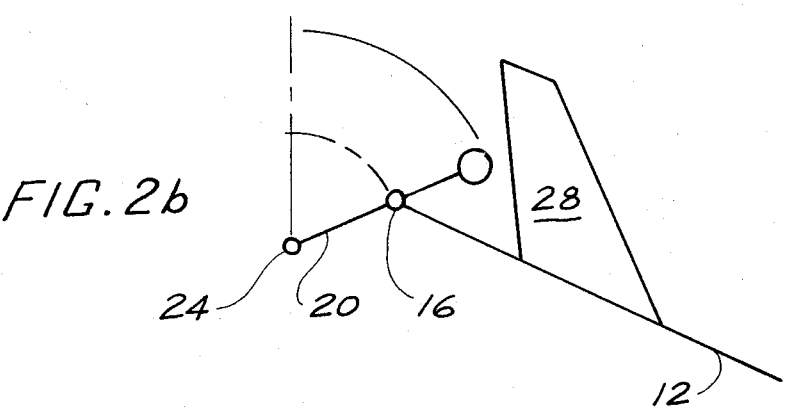
Figure 2C:
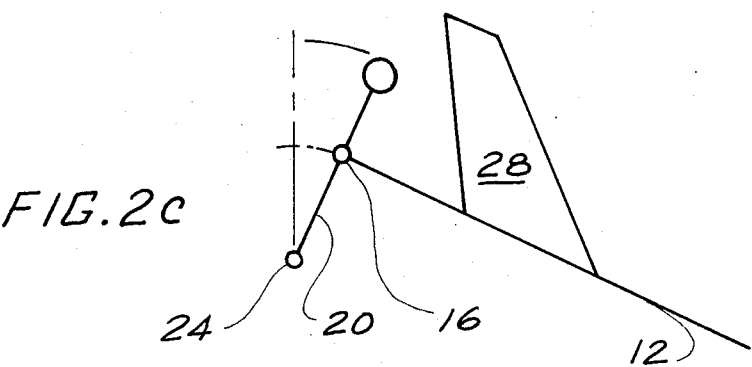

From the extreme forward position of FIG. 2a in the diagrams, the deflector rises and moves rearward as the pushrod control lever swings through the FIG. 2b position and the FIG. 2c position. As the pushrod control lever nears the vertical, where less protection is needed because of opening of the "V" angle, the gap between it and the deflector opens somewhat, but the height of the deflector continues to provide protective shielding.

Figure 3:
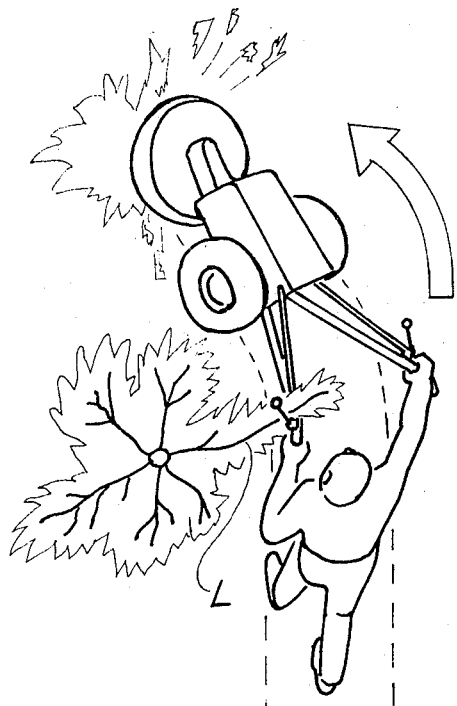
FIGS. 3 and 4 are downward views showing in perspective an implement not having the system of the invention and an implement having the system, both implements being in operation in a typical environment.
Figure 4:
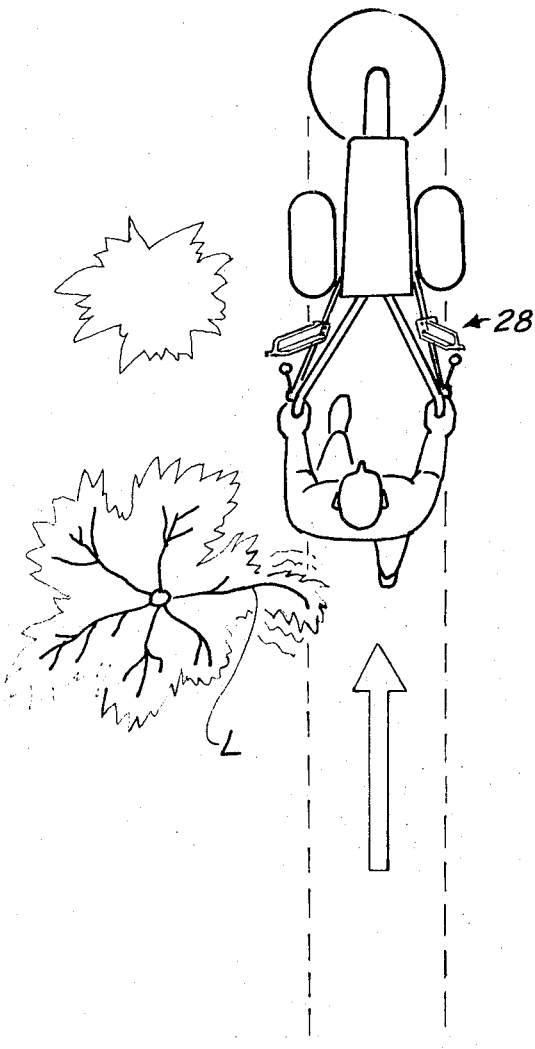

FIG. 3 and 4 are to be contrasted. The accident described earlier, which occurred before the invention was made, is shown in FIG. 3 just as the vehicle was tipping, being pulled around by momentum and thrust the right drive-wheel against the restraint and lift of the limb L, caught in the "V" under the left hand pushrod control lever. FIG. 4 shows the same scene as it would have been with the invention in use, as proved by trials in similar circumstances using the invention.

Obviously, many modifications and variations of the present invention are possible in light of the above teachings. For example, although the invention is described and claimed for convenience and clarity of exposition in the context of an upwardly pivoting pushrod control lever, the invention will function as reliably with a laterally or a downwardly pivoting pushrod control lever. It is, therefore, to be understood that within the scope of the appended claims the invention may be practiced otherwise than as specifically described.

What is claimed and desired to be secured by United States Letters Patent is:

1. A moving-implement control-guard system for mounting on a handle of said implement comprising a moving control including a pushrod control lever pivoted at one end to said a handle, a pushrod, means pivotally attaching the pushrod intermediate the length of the pushrod control lever with the pushrod extending forwardly from the pushrod control lever, and a deflector fixedly attached to the pushrod adjacently forward of the pushrod control lever so as to move with the moving control with the deflector protectively following when the pushrod control lever is pivoted rearwardly, the deflector including a fin inclined rearwardly with respect to the direction of motion of the implement at an angle overhanging and shielding a portion of the pushrod control lever and adapting the fin to shunt away resilient obstacles and the like encountered as result of forward movement of the implement.

2. A moving-implement control-guard system as recited in claim 1, wherein the deflector has a flange along the rearward edge of the fin, a flange along the bottom edge of the fin continuous with the flange along the rearward edge of the fin and having a groove therebeneath adapting the base for attachment to said pushrod, all said flnages together forming in side view the shape of an open "L;" wherein the forward edge of the fin is angled rearwardly and upwardly and wherein the fin has a top edge angled rearwardly and upwardly at a lesser upward angle than the forward edge of the fin, thereby adapting the top edge of the fin to retard springback of said resilient obstacles and the like when shunted away by the forward edge of the fin.

3. A moving-implement control-guard system as recited in claim 2, wherein said fixed attachment of the deflector includes at least one "U" clamp, with the loop of the "U" clamp engaging the pushrod.

4. A moving-implement control-guard system as recited in claim 1, wherein said angle is substantially tangential to a forward portion of the arc of travel of the pushrod control lever.

5. A moving-implement control-guard system as recited in claim 4, wherein the pushrod tends downwardly as well as forwardly of the pushrod control lever, and wherein the deflector protectively rises with the pushrod control lever as well as following it when the pushrod control lever is pivoted rearwardly from a forwardly tending position.

* * * * *